J. W. THOMPSON.
Corn-Marker.

No. 208,438.   Patented Sept. 24, 1878.

Witnesses:
Porter Crane
Emma Asbey

Inventor:
John W. Thompson
pr Phil T. South, Atty

UNITED STATES PATENT OFFICE.

JOHN W. THOMPSON, OF CLERMONT COUNTY, OHIO.

IMPROVEMENT IN CORN-MARKERS.

Specification forming part of Letters Patent No. 208,438, dated September 24, 1878; application filed May 3, 1878.

*To all whom it may concern:*

Figure 1:
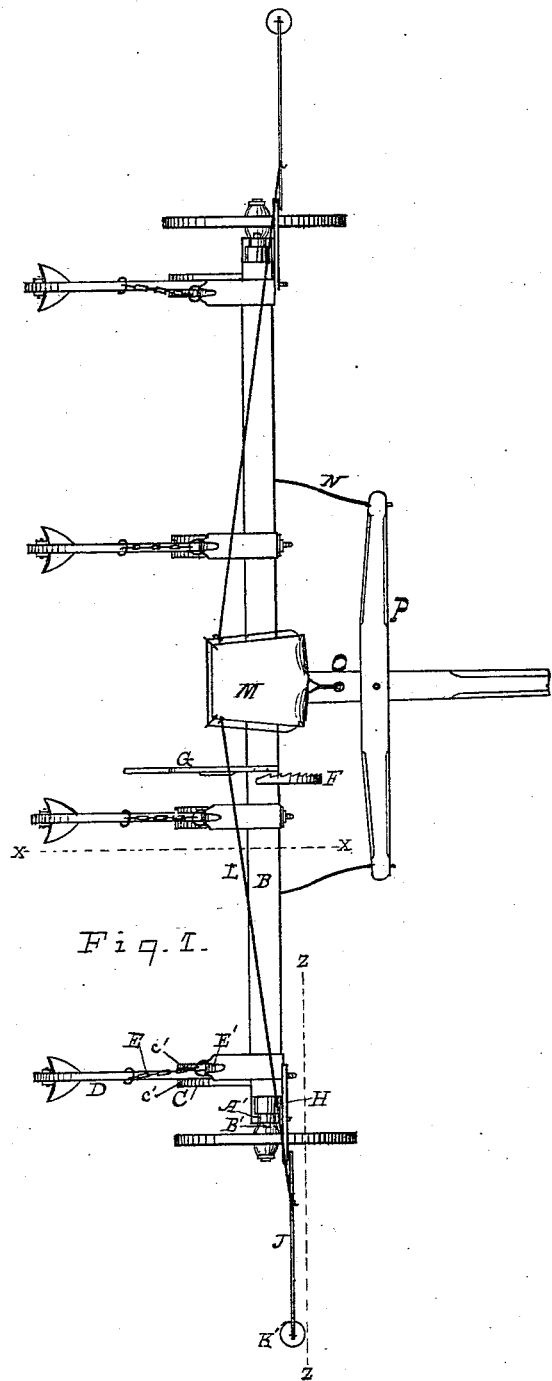
Figure 2:
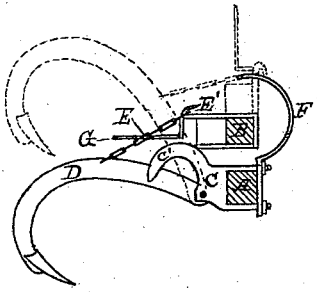
Figure 3:
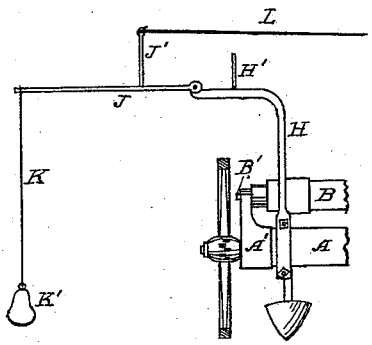

Be it known that I, JOHN W. THOMPSON, of Clermont county and State of Ohio, have invented a new and useful Improvement in Corn-Ground Markers, of which the following is a specification:

Figure 1 is a top-plan view complete of my improved invention—field-marking plow. Fig. 2 is an end sectional view, showing the construction and working of the plow or markers. Fig. 3 is an end front view of my invention, showing the manner of constructing the tumbler or roller which holds the plows in position, and also the drag or indicator for spacing the rows and the cord for operating the drag.

Similar letters of reference indicate corresponding parts, which will be described in connection with the drawing, and then pointed out in my claims.

The object of my invention is to furnish an improved machine or implement for marking out land for planting corn and other things to be planted in rows, which is simple in its construction, convenient to use, readily and easily adjusted to make the markers a greater or less distance apart.

A is a long axle (which may be made of wood, iron, or hollow tube) for holding the plows in position. This axle may be made any desired length for carrying any number of plows, although only four are shown.

B is the tumbler or roller, fastened at each end of the long axle A by means of a spindle (upon which the tumbler turns) entering a hole in the top end of the end of the long axle A, as shown at A′ B′, Fig. 3.

C is the clamp, with projecting jaws c′ c′, which is bolted to the long axle A, for the purpose of holding the shovel-plow arm D in its proper place, as shown in Fig. 1.

D is the arm with the shovel-plows attached, as shown in Fig. 2.

E is the chain attachment connecting the arm D with the tumbler or roller B, as fully shown. E′ is a hook attachment for fastening the chain, so that it may be removable at will.

F is a curved iron segment, having teeth for holding the lever G in place when the shovels of the plow are raised off the ground by the action of the tumbler.

G is the lever, which is fastened to the top of the tumbler or roller B, for the use of the operator in raising and lowering the plows, as shown.

H is the main arm, which supports the arms J and J′ of the drag or indicator. H′ is an upright arm, used as a rest for the drag or indicator J and J′ when raised entirely free from obstructions.

J is the main arm, at the outer end of which is attached the drag K, as shown. J′ is a branch arm of the main arm J, at the top of which is a hole for the cord to pass through and fasten, for the use of the driver to operate the drag from his seat.

K is the drag-rod, at the lower end of which is suspended a pear-shaped indicator, as shown in the figure. K′ is the pear-shaped indicator, fastened to the end of the drag-rod K, as shown.

L is the line or cord to the right and left of the seat M, connecting with the arm J′ and the operator's seat M, for the purpose of controlling the height of the arm J, to keep the drag or indicator K and K′ from coming in contact with stumps, &c.

M is the operator's seat, held firmly to its place by strong iron braces fastened to the long axle A and the tongue O, from which seat the lever G and the cord L are operated by the driver.

N are the iron rods, made fast to the double-tree P and the long axle A, thereby making the double-tree perfectly stationary, which is for the purpose of giving steadiness to the draft and assisting in turning the machine.

O is the tongue, which is made fast to the long axle A in the center.

P is the double-tree, which is made fast to the tongue by being bolted in the center, and to the long axle A by means of iron rods N.

I claim—

1. The shovel-holding clamp C, with jaws c′, held by friction to the axle A, the hooked chain-carrier E′, loosely sliding upon the shaft B, arranged and combined with the shovel-arm D and the said axle and shaft, so as to be adjusted at will, as specified.

2. The marking device described, consisting of the arm J J', pivoted to the arm H, the pendent drag K K', and the operating-cord L, leading to the driver's seat, as and for the purpose specified.

3. The crotched upright H' on the arm H, adapted to receive the arm J' when the marker is not in use, and hold the same by the weight of the flexible swiveled drag, which is turned inward, as herein specified.

JOHN W. THOMPSON.

Witnesses:
PORTER CRANE,
EMMA ULREY.